US008873454B2

(12) United States Patent
Chen et al.

(10) Patent No.: US 8,873,454 B2
(45) Date of Patent: Oct. 28, 2014

(54) APPARATUS AND METHOD FOR TRANSMIT-RESPONSE TIMING FOR RELAY OPERATION IN WIRELESS COMMUNICATIONS

(75) Inventors: Wanshi Chen, San Diego, CA (US); Aleksandar Damnjanovic, Del Mar, CA (US); Ravi Palanki, San Diego, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 12/970,765

(22) Filed: Dec. 16, 2010

(65) Prior Publication Data
US 2011/0149774 A1   Jun. 23, 2011

Related U.S. Application Data

(60) Provisional application No. 61/288,159, filed on Dec. 18, 2009.

(51) Int. Cl.
*H04J 1/10* (2006.01)
*H04L 1/18* (2006.01)
*H04L 1/00* (2006.01)

(52) U.S. Cl.
CPC ............. *H04L 1/1854* (2013.01); *H04L 1/1812* (2013.01); *H04L 1/1887* (2013.01); *H04L 2001/0097* (2013.01)
USPC .......................................................... 370/315

(58) Field of Classification Search
None
See application file for complete search history.

(56) References Cited

U.S. PATENT DOCUMENTS

| 2009/0067364 | A1* | 3/2009 | Chang et al. | 370/315 |
| 2009/0175214 | A1  | 7/2009 | Sfar et al. | |
| 2011/0041027 | A1* | 2/2011 | Fong et al. | 714/749 |

FOREIGN PATENT DOCUMENTS

| JP | 2008510331 A | 4/2008 |
| JP | 2008553798 A | 8/2008 |
| JP | 2010538570 A | 12/2010 |
| JP | 2011509608 A | 3/2011 |
| JP | 2011517168 A | 5/2011 |
| JP | 2011523522 A | 8/2011 |
| TW | 200945928 A | 11/2009 |
| WO | WO2009031866 A2 | 3/2009 |
| WO | WO-2009089664 A1 | 7/2009 |
| WO | WO-2009093662 A1 | 7/2009 |
| WO | WO-2009116754 A2 | 9/2009 |
| WO | 2009129612 A1 | 10/2009 |

OTHER PUBLICATIONS

International Search Report and Written Opinion -PCT/US2010/061152, International Search Authority -European Patent Office—Mar. 31, 2011.
InterDigital: "FDD Relay Type I Backhaul interference and HARQ issues", 3GPP TSG-RAN WG2 Meeting #68, Nov. 9, 2009, R2-096893, (2012-18014-553).
Taiwan Search Report—TW099144800—TIPO—Apr. 26, 2013.

* cited by examiner

*Primary Examiner* — Minh-Trang Nguyen
(74) *Attorney, Agent, or Firm* — Michael J. DeHaemer, Jr.

(57) ABSTRACT

An apparatus and method for relay operation in a wireless communication system comprising determining a first set of subframes for downlink communication from an eNB to a relay node; determining a second set of subframes for uplink communication from the relay node to the eNB; determining a downlink (DL) hybrid automatic repeat request (HARQ) timing between a first control transmission and a HARQ acknowledge (ACK) message based on a first minimum delay and the first and the second sets of subframes; and determining an uplink (UL) hybrid automatic repeat request (HARQ) timing between a second control transmission and an uplink transmission based on a second minimum delay and the first and the second sets of subframes.

50 Claims, 9 Drawing Sheets

APPARATUS AND METHOD FOR TRANSMIT-RESPONSE TIMING FOR RELAY OPERATION IN WIRELESS COMMUNICATIONS

CLAIM OF PRIORITY UNDER 35 U.S.C. §119

The present Application for Patent claims priority to Provisional Application No. 61/288,159 entitled "Transmit-Response Timing for Relay in Wireless Communications" filed Dec. 18, 2009, and assigned to the assignee hereof and hereby expressly incorporated by reference herein.

BACKGROUND

1. Field

This disclosure relates generally to apparatus and methods for providing optimized signaling for high-speed wireless communication. More particularly, the disclosure relates to transmit-response timing for relay operation in wireless communication.

2. General Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Tenn Evolution (LTE) systems, and orthogonal frequency division multiple access (OFDMA) systems.

Generally, a wireless multiple-access communication system may simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

In general multiple access wireless communications are managed at least in part from a serving network as a controller or arbiter of wireless traffic. The serving network may send control information to user equipment, assigning particular wireless resources to different access terminals, managing uplink and downlink interference, coordinating MIMO transmissions among neighboring base stations, sharing network load among available base stations, and so on. In essence, the serving network acts as a central planner for managing disparate wireless communications, to ensure consistency for high quality traffic and moderate reliability for best effort traffic.

As networks expand in geography and both networks and user equipment evolve in electronic capabilities, network management takes on additional complexity. Backward compatibility is a particular constraint that may potentially add much design complexity to network planning and deployment. New electronic capabilities, both on network equipment and user equipment, enable new wireless features, services, and performance for wireless communication. However, these new capabilities may often require changes to standardized mechanisms for conducting wireless communication. These changes may often preclude equipment designed on a previous standard from employing a new standard, however. Particularly for user equipment, significant changes in standards may render millions of mobile phones, computer accessories, and so on, that employ wireless communications obsolete. Backward compatibility, on the other hand, ensures support for legacy equipment in conjunction with new standards designed around new electronic features and capabilities.

Perpetually porting older standards into newer systems may lead to convoluted wireless communication architectures, however, based on fractured or fragmented rule sets for different types of electronic equipment. Accordingly, new research in wireless communications is typically directed at accommodating new technology without prejudicing equipment that operates the technology or legacy devices that employ them. This concept typically applies for radio access network infrastructure (e.g., base stations, relay stations, repeater stations, base station controllers, mobile switching centers, and so on), core network infrastructure (e.g., location registers, billing and charging servers, subscription servers, customer support infrastructure, etc.), as well user equipment itself (e.g., mobile phones, personal digital assistants, smart phones, and the like). Wireless communication standards groups (e.g., 3GPP, 3GPP2) are typically charged with keeping these concerns in mind when adopting new standards for access networks, core networks and user equipment, based on new and emerging electronic technologies.

SUMMARY

The present disclosure provides for transmit-response timing for relay operation in wireless communication. In some aspects of the present disclosure, a timing configuration is provided that achieves consistent support for user terminals based on non-relay standards and new relay-adapted user terminals. In a particular aspect, the timing configuration provides multicast broadcast single frequency network (MBSFN) sub frames for relay operation on a backhaul network. Furthermore, the timing configuration adopts a downlink periodicity that supports either 8 ms systems, 10 mms systems, or both 8 ms and 10 ms systems in at least one aspect. Uplink periodicity may be based similarly on 8 ms, 10 ms or a combined periodicity, or may be tied to a selected downlink periodicity. According to one particular aspect, an ad-hoc transmit-response timing is provided that specifies timing relationships on a next-available basis, for configured sub frames. According to other aspects, asymmetric uplink and downlink mapping is adopted to provide ACK/NACK timing for control channel subframes on an access link network between the relay node and a user terminal, and/or on the backhaul network. According to still other aspects, a downlink control channel may be employed for both control messages and for packet ACK/NACK messaging, to streamline operation of the relay node. As described, the present disclosure provides a consistent timing configuration for relay operation that accommodates new as well as legacy electronic devices and standards.

According to a particular aspect, disclosed is a method for transmit-response timing for relay operation in wireless communication. The method may comprise employing a communication interface to transmit control data to a relay node (RN) over a wireless backhaul (BH) according to a timing configuration. The method may also comprise employing the communication interface to receive a response to the control data from the relay node over the wireless BH according to the timing configuration. Moreover, the method may comprise employing a data processor to analyze the response for consistency with the timing configuration, wherein the timing configuration provides BH response periodicity that accommodates a plurality of legacy timing configurations.

According to another aspect, provided is an apparatus for transmit-response timing for relay operation in wireless communication. The apparatus may comprise a wireless transceiver that transmits and receives wireless signals over a wireless BH network with a RN. Further, the apparatus may comprise memory for storing modules configured to implement wireless communication with the RN over the BH network and a data processor for executing the modules. Particularly, the modules may comprise a control module that generates a control message according to a timing configuration, wherein the control module employs the wireless transceiver to send the control message to the RN to manage wireless BH communication of the RN and a verification module that employs the wireless transceiver to obtain a response to the control message from the RN and verify consistency of the response and the timing configuration, wherein the timing configuration provides transmit-response timing for the BH network and for a wireless access link (AL) between the RN and user equipment and the timing configuration supports at least two legacy timing configurations.

According to another aspect an apparatus for transmit-response timing for relay operation in wireless communication is provided. The apparatus may comprise means for employing a communication interface to transmit control data to a RN over a wireless BH according to a timing configuration. Further, the apparatus may comprise means for employing the communication interface to receive a response to the control data from the relay node over the wireless BH according to the timing configuration. In addition to the foregoing, the apparatus may comprise means for employing a data processor to analyze the response for consistency with the timing configuration, wherein the timing configuration provides BH response periodicity that accommodates a plurality of legacy timing configurations.

In other aspects at least one processor configured for transmit-response timing for relay operation in wireless communication is provided. The processor(s) may comprise a module that transmits control data to a relay node (RN) over a wireless backhaul (BH) according to a timing configuration. Moreover, the processor(s) may comprise a module that receives a response to the control data from the relay node over the wireless BH according to the timing configuration. Further to the above, the processor(s) may comprise a module that analyzes the response for consistency with the timing configuration, wherein the timing configuration provides BH response periodicity that accommodates a plurality of legacy timing configurations.

In yet other aspects, the present disclosure provides a computer program product, comprising a computer-readable medium. The computer-readable medium may comprise code for causing a computer to transmit control data to a RN over a wireless BH according to a timing configuration. Moreover, the computer-readable medium may comprise code for causing the computer to receive a response to the control data from the relay node over the wireless BH according to the timing configuration. Additionally, the computer-readable medium may comprise code for causing the computer to analyze the response for consistency with the timing configuration, wherein the timing configuration provides BH response periodicity that accommodates a plurality of legacy timing configurations.

According to one or more further aspects, disclosed is a method for transmit-response timing for relay operation in wireless communication. The method may comprise employing a communication interface to receive a DL message over a BH network comprising control data. The method may also comprise employing a data processor to reference a control specification to determine a timing configuration for responding to the control data over the BH network. Moreover, the method may comprise employing the communication interface to transmit a response message on an UL over the BH network, wherein the timing configuration supports both 10 ms and 8 ms wireless timing configurations.

In still other aspects, provided is an apparatus for transmit-response timing for relay operation in wireless communication. The apparatus may comprise a half-duplex communication interface for sending and receiving data on a BH network or for sending and receiving data on a wireless AL. Further, the apparatus may comprise memory for storing modules configured to implement a consistent timing configuration for the BH network or the AL and a data processor for executing the modules. Particularly, the modules may comprise a receiver module for obtaining control messages on a downlink (DL) over the BH network and a management module for transmitting or receiving data according to the consistent timing configuration on either the BH network or the AL, wherein the consistent timing configuration comprises an ad-hoc timing rule for control response on the BH network.

Further to the above, one or more other aspects provide an apparatus for transmit-response timing for relay operation in wireless communication. The apparatus may comprise means for employing a communication interface to receive a DL message over a BH network comprising control data. The apparatus may also comprise means for employing a data processor to reference a control specification to determine a timing configuration for responding to the control data over the BH network. In addition, the apparatus may comprise means for employing the communication interface to transmit a response message on an UL over the BH network, wherein the timing configuration supports both 10 ms and 8 ms wireless timing configurations.

In yet other aspects disclosed is at least one data processor configured for transmit-response timing for relay operation in wireless communication. The processor(s) may comprise a module for receiving a DL message over a BH network comprising control data. The processor(s) may further comprise a module for referencing a control specification to determine a timing configuration for responding to the control data over the BH network. Moreover, the processor(s) may additionally comprise a module for transmitting a response message on an UL over the BH network, wherein the timing configuration supports both 10 ms and 8 ms wireless timing configurations.

In at least one additional aspect, provided is a computer program product comprising a computer-readable medium. The computer-readable medium may comprise code for causing a computer to receive a DL message over a BH network comprising control data. Moreover, the computer-readable medium may comprise code for causing the computer to reference a control specification to determine a timing configuration for responding to the control data over the BH network. In addition to the foregoing, the computer-readable medium may comprise code for causing the computer to transmit a response message on an UL over the BH network, wherein the timing configuration supports both 10 ms and 8 ms wireless timing configurations.

According to another aspect, a method for relay operation in a wireless communication system comprising determining a first set of subframes for downlink communication from an eNodeB (eNB) to a relay node; determining a second set of subframes for uplink communication from the relay node to the eNB; determining a downlink (DL) hybrid automatic repeat request (HARQ) timing between a first control transmission and a HARQ acknowledge (ACK) message based on a first minimum delay and the first and the second sets of subframes; and determining an uplink (UL) hybrid automatic repeat request (HARQ) timing between a second control transmission and an uplink transmission based on a second minimum delay and the first and the second sets of subframes.

According to another aspect, an apparatus for relay operation in a wireless communication system comprising means for determining a first set of subframes for downlink communication from an eNodeB (eNB) to a relay node; means for determining a second set of subframes for uplink communication from the relay node to the eNB; means for determining a downlink (DL) hybrid automatic repeat request (HARQ) timing between a first control transmission and a HARQ acknowledge (ACK) message based on a first minimum delay and the first and the second sets of subframes; and means for determining an uplink (UL) hybrid automatic repeat request (HARQ) timing between a second control transmission and an uplink transmission based on a second minimum delay and the first and the second sets of subframes.

According to another aspect, an apparatus for relay operation in a wireless communication system comprising a processor and a memory, the memory containing program code executable by the processor for performing the following: determining a first set of subframes for downlink communication from an eNodeB (eNB) to a relay node; determining a second set of subframes for uplink communication from the relay node to the eNB; determining a downlink (DL) hybrid automatic repeat request (HARQ) timing between a first control transmission and a HARQ acknowledge (ACK) message based on a first minimum delay and the first and the second sets of subframes; and determining an uplink (UL) hybrid automatic repeat request (HARQ) timing between a second control transmission and an uplink transmission based on a second minimum delay and the first and the second sets of subframes.

According to another aspect, a computer program product for relay operation in a wireless communication system comprising a computer-readable medium comprising: codes for determining a first set of subframes for downlink communication from an eNodeB (eNB) to a relay node; codes for determining a second set of subframes for uplink communication from the relay node to the eNB; codes for determining a downlink (DL) hybrid automatic repeat request (HARQ) timing between a first control transmission and a HARQ acknowledge (ACK) message based on a first minimum delay and the first and the second sets of subframes; and codes for determining an uplink (UL) hybrid automatic repeat request (HARQ) timing between a second control transmission and an uplink transmission based on a second minimum delay and the first and the second sets of subframes.

Advantages of the present disclosure may include accommodating a relay node with legacy equipment, particularly with respect to transmit-response timing.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
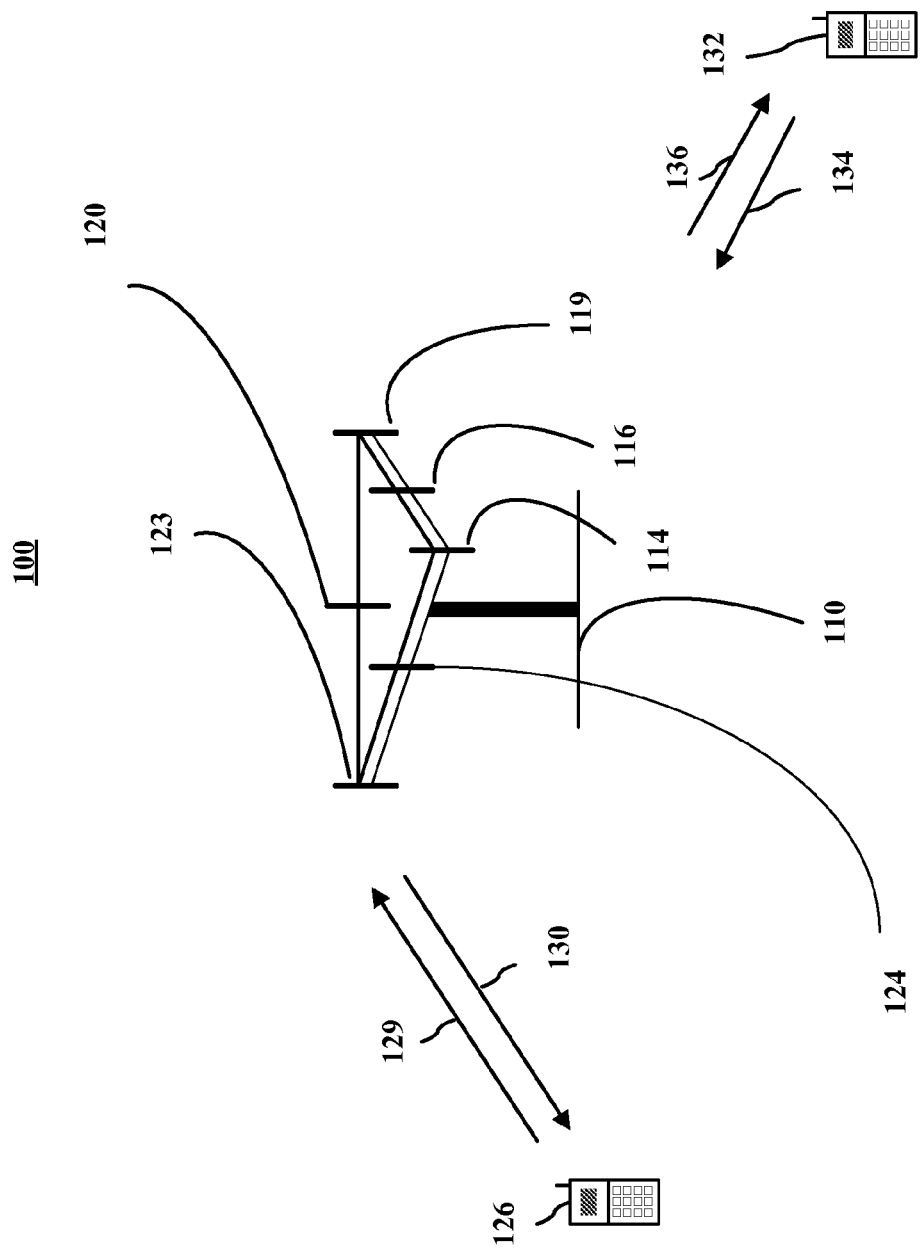
FIG. 1 illustrates a block diagram of an example wireless environment suitable for network to mobile communication.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc.

The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 illustrates a block diagram of an example wireless environment suitable for network to mobile communication. An access point 110 (AP) includes multiple antenna groups, one including 119 and 120, another including 123 and 124, and an additional including 114 and 116. In FIG. 1, only two antennas are shown for each antenna group, however, more or fewer antennas may be utilized for each antenna group. Access terminal 126 (AT) (erg., a user equipment or UE) is in communication with antennas 123 and 124, where antennas 123 and 124 transmit information to access terminal 126 over forward link 130 and receive information from access terminal 126 over reverse link 129. Access terminal 132 is in communication with antennas 114 and 116, where antennas 114 and 116 transmit information to access terminal 132 over forward link 136 and receive information from access terminal 132 over reverse link 134. In a FDD system, communication links 129, 130, 134 and 136 may use different frequency for communication. For example, forward link 130 may use a different frequency then that used by reverse link 129.

Each group of antennas and/or the area in which they are designed to communicate is often referred to as a sector of the access point. In the present disclosure, antenna groups each are designed to communicate to access terminals in a sector, of the areas covered by access point 110.

In communication over forward links 130 and 136, the transmitting antennas of access point 110 utilize beamforming in order to improve the signal-to-noise ratio of forward links for the different access terminals 126 and 132. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
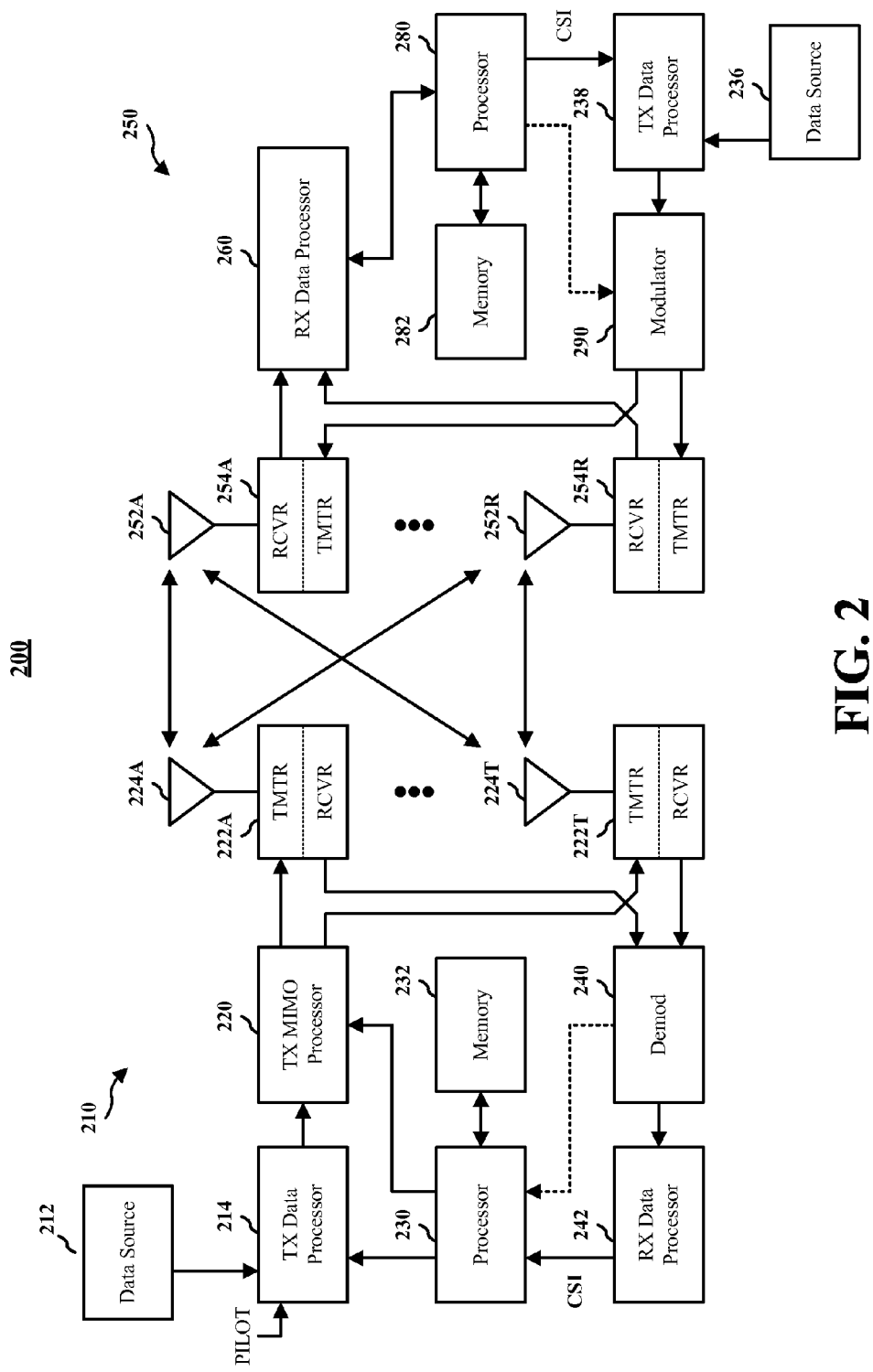
FIG. 2 illustrates a block diagram of an example wireless transmit-receiver chain facilitating wireless communication according to some aspects.

FIG. 2 illustrates a block diagram of an example wireless transmit-receiver chain facilitating wireless communication according to some aspects. In one aspect, FIG. 2 illustrates a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In one aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222A through 222T. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222A through 222T are then transmitted from $N_T$ antennas 224A through 224T, respectively.

At receiver system 250, the transmitted modulated signals are received by $N_R$ antennas 252A through 252R and the received signal from each antenna 252 is provided to a respective receiver (RCVR) 254A through 254R. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 280 periodically determines which pre-coding matrix to use (discussed below). Processor 280 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 290, conditioned by transmitters 254A through 254R, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250.

Processor 230 then determines which pre-coding matrix to use for determining the beamforming weights then processes the extracted message.

In an aspect, logical channels are classified into Control Channels and Traffic Channels. Logical Control Channels comprise Broadcast Control Channel (BCCH) which is a DL channel for broadcasting system control information. Paging Control Channel (PCCH) which is a DL channel that transfers paging information. Multicast Control Channel (MCCH) which is a Point-to-multipoint DL channel used for transmitting Multimedia Broadcast and Multicast Service (MBMS) scheduling and control information for one or several Multicast Traffic Channels (MTCH)s. Generally, after establishing RRC connection this channel is only used by UEs that receive MBMS (Note: old MCCH+MSCH). Dedicated Control Channel (DCCH) is a Point-to-point bi-directional channel that transmits dedicated control information and used by UEs having an RRC connection. In an aspect, Logical Traffic Channels comprise a Dedicated Traffic Channel (DTCH) which is a Point-to-point bi-directional channel, dedicated to one UE, for the transfer of user information. Also, the Logical Traffic Channels may comprise a MTCH for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over an entire cell and mapped to PHY resources which may be used for other control/traffic channels. The UL Transport Channels comprise a Random Access Channel (RACH), a Request Channel (REQCH), an Uplink Shared Data Channel (UL-SDCH) and a plurality of PHY channels. The PHY channels comprise a set of DL channels and UL channels.

The DL PHY channels comprise a Common Pilot Channel (CPICH), Synchronization Channel (SCH), Common Control Channel (CCCH), Shared DL Control Channel (SDCCH), Multicast Control Channel (MCCH), and Shared UL Assignment Channel (SUACH). Furthermore, the DL PHY channels may comprise an Acknowledgement Channel (ACKCH), DL Physical Shared Data Channel (DL-PSDCH), UL Power Control Channel (UPCCH), Paging Indicator Channel (PICH), and a Load Indicator Channel (LICH).

The UL PHY Channels comprise a Physical Random Access Channel (PRACH), Channel Quality Indicator Channel (CQICH), and Acknowledgement Channel (ACKCH). Further, the UL PHY channels comprise an Antenna Subset Indicator Channel (ASICH), Shared Request Channel (SREQCH), UL Physical Shared Data Channel (UL-PSDCH), and a Broadband Pilot Channel (BPICH).

Figure 3:
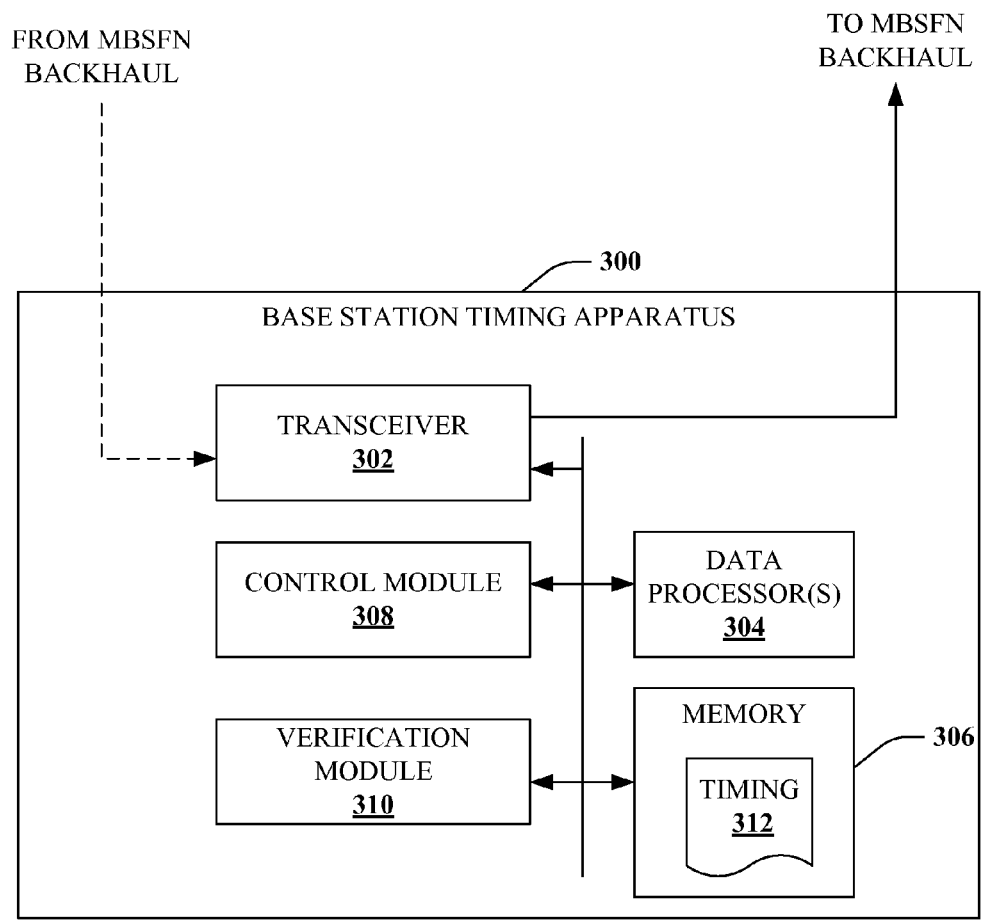
FIG. 3 illustrates a block diagram of an example timing configuration apparatus for a network base station according to aspects of the present disclosure.

FIG. 3 illustrates a block diagram of an example timing configuration apparatus for a network base station according to aspects of the present disclosure. In one aspect, FIG. 3 illustrates an example base station timing apparatus 300 for providing timing configuration for wireless network communication employing a relay node (RN)—not depicted. The timing configuration may comprise backhaul (BH) timing configuration for wireless communication between a network base station and the RN. Particularly, timing configuration may include the set of subframes for control and data channel communication, including automatic repeat request (ARQ) communication, hybrid ARQ (HARQ) communication, acknowledgment (ACK)/negative ACK (NACK) transmissions and so on, between the network base station and the RN. Further, access link (AL) timing configuration may be specified by the timing configuration to control scheduling and control of AL wireless communication between the RN and an access terminal (AT).

Further to the above, base station timing apparatus 300 may be coupled with a base station of a wireless network. In such case, apparatus 300 may be employed by the base station to implement the timing configuration 312 stored in memory 306 of apparatus 300. Timing configuration 312 may be implemented by the base station with control signaling for the BH link with RN and for an AL between RN and the AT. In at least one aspect, control signaling for the BH link may be performed on a per RN basis on the backhaul subframes. In one aspect, multimedia broadcast single frequency network (MBSFN) subframes may be employed for the BH link at the RN. In such case, RN may be a half-duplex transmitter or a full duplex transmitter, as suitable.

In one particular example, apparatus 300 comprises a wireless communication interface (which may include a wireless transceiver, or an electronic communication interface with the wireless transceiver) 302 that transmits and receives wireless signals over the wireless BH network with the RN. Further, apparatus 300 may comprise a memory for storing a set of modules configured to implement timing configuration 312, and a data processor 304 configured to execute the set of modules. In one aspect, the data processor 304 includes a timing configuration unit (305) (not shown) to implement the timing configuration 312 stored in the memory 306. Specifically, apparatus 300 may comprise a control module 308 that generates a control message according to timing configuration 312 and employs the communication interface 302 to send the control message to the RN to manage wireless BH communication of the RN. Additionally, apparatus 300 may comprise a verification module 310 that employs the communication interface 302 to obtain a response to the control message from the RN and verifies consistency of the response and the timing configuration 312. In one aspect, timing configuration 312 may provide transmit-response timing for the BH network and for a wireless access link (AL) between the RN and user equipment. In an alternate or additional aspect, timing configuration 312 may also provide timing configuration that supports at least two legacy timing configurations.

As a particular example, timing configuration 312 may comprise BH and AL subframe periodicity for downlink (DL) transmission that supports an 8 millisecond (ms) system, a 10 ms system, or a combination thereof. In the latter case, timing configuration 312 may be based on a 40 ms system, or other suitable periodicity incorporating 8 ms and 10 ms systems (e.g., 80 ms). For uplink (UL) transmission, timing configuration 312 may provide 8 ms HARQ timing for the BH network as well as the AL. Alternatively, UL transmission may be dependent on DL periodicity. For instance, where DL comprises 40 ms periodicity, UL comprises 8 ms periodicity, or where DL comprises 10 ms periodicity UL may comprise 10 ms periodicity as well.

In at least one aspect of the present disclosure, a BH timing configuration may employ ad-hoc timing for transmit-response transmissions. For instance, HARQ transmission or like repeat-request communication may be based on availability of a subframe assigned to the BH network, rather than a predetermined number of general subframes. The BH timing configuration may be explicitly indicated by layer 3 or layer 2 (semi-static) signaling, in one disclosed aspect. In another disclosed aspect, the BH timing configuration is specified in specifications according to a deterministic rule defining timing relationships between downlink channels and uplink responses. As particular examples, timing configurations may provide a subframe relationship for a next available (or a number of next available) dedicated BH subframe (e.g., MBSFN subframe at the RN) between relay physical downlink shared channel (R-PDSCH) messages and UL ACK/NACK messages, between relay physical downlink control channel (R-PDCCH) messages and relay physical uplink shared channel (R-PUSCH) messages, or R-PUSCH messages and R-PDCCH or relay physical HARQ indicator channel (R-PHICH) messages, or the like, or a combination thereof.

According to still other aspects of the present disclosure, BH timing configuration may comprise asynchronous mapping between DL and UL subframes. In such case, at least one DL BH subframe (e.g., subframe n, where n is a positive integer) is mapped with at least one UL BH subframe (e.g., n+4). Further, multiple DL BH subframes may be mapped to a single UL BH subframe in some aspects. In still other aspects, messages in a single DL BH subframe may be mapped for ACK/NACK messaging in multiple UL BH subframes. For instance, PHICH messages may be bundled with ACK/NACK subframes in one or more of the foregoing manners.

Similarly, AL timing configuration may comprise asynchronous mapping between DL and UL subframes. In such a case, at least one DL AL subframe (e.g., subframe n, where n is a positive integer) is mapped with at least one UL AL subframe (e.g., n+4). Further, multiple DL AL subframes may be mapped to a single UL AL subframe in some aspects. In other aspects, messages in a single DL AL subframe may be mapped for ACK/NACK messaging in multiple UL AL subframes. For example, PHICH messages may be bundled with ACK/NACK subframes in one or more of the foregoing manners.

As a specific example, single DL to multiple UL mapping may be implemented as follows. Multiple UL PUSCH messages may be coupled with PHICH/PDCCH concurrently in a common DL subframe. Further, UL ACK/NACK bundling may also be provided for the BH network. That is, the feedback of multiple ACK/NAKs in a common UL subframe in response to DL data transmissions in multiple DL subframes may be transmitted such that some bundling of these ACK/NAKs are performed first before the transmissions. As an example, the bundling may be done, on a per codeword basis, across the set of multiple DL subframes. As another example, the bundling may be done, within a DL subframe, across two or more codewords. As yet another example, the bundling may be done via combination of the above two examples. In another aspect, one PDCCH may be scheduled to two or more PUSCH transmissions (e.g., with a common resource allocation, or modulation and coding scheme, or the like. In another aspect, up to two PUSCHs may be configured and optionally limited to a first two UL subframes. Additionally, PHICH may be employed to suspend one or more UL transmissions, for instance if an expected response is not received at verification module 310 in a specified subframe.

As further examples of a single DL to M UL mapping, where M is an integer greater than one, one PDCCH may be assigned to address all M UL subframes. As an alternative, M PDCCHs addressing the M UL subframes may be provided where each PDCCH schedules one UL subframe. As yet another alternative to the foregoing, M PDCCHs may be assigned to address K UL subframes, where each PDCCH schedules a set number (e.g., L, where L is a suitable integer no greater than K) of UL subframes.

As another particular example, third generation partnership project (3GPP) long term evolution (LTE) wireless system (e.g., Release 8) time division duplex (TDD) may be provided for one configuration, where one DL subframe schedules K UL subframes. In such case, a grouping of K subframes may be contiguous or non-contiguous. For instance, for M=4, K=2 a {DL, UL} mapping may be {1,2} and {3,4} or {1,3} and {2,4} (or another suitable combination of DL and UL subframes), where the numbers represent the indices of the subframes within the set of K subframes. PHICH may also be designed in a similar fashion based on this mapping. In one aspect, a single PHICH may address all M UL subframes. In this aspect, TDD-like UL ACK/NACK bundling may be employed to bundle the M subframes. In an alternative aspect, K PHICHs may be employed to address M UL subframes, where each PHICH handles (M/K) UL subframes. Moreover, for 3GPP LTE Rel-8 TDD, with 1 DL mapping to 2 UL, K may be equal to 2. Within each (M/K) UL subframe, TDD-like bundling may be applied. Further, the grouping of (M/K) UL subframes may be contiguous or non-contiguous.

According to one further aspect, R-PHICH may be replaced by R-PDCCH. Some overhead efficiency may be sacrificed by replacing R-PHICH messages, but the resulting timing configuration may be mapped more effectively to dedicated BH subframes (e.g., MBSFN subframes at the RN) for the BH link. In the case of synchronized HARQ operation in the UL on the BH network, if the RN misses a R-PDCCH message, the RN may suspend a R-PUSCH transmission, and repeat a previous transmission until a suitable R-PDCCH message is received to ACK the repeated transmission. The RN may then proceed with the R-PUSCH transmission.

Figure 4:
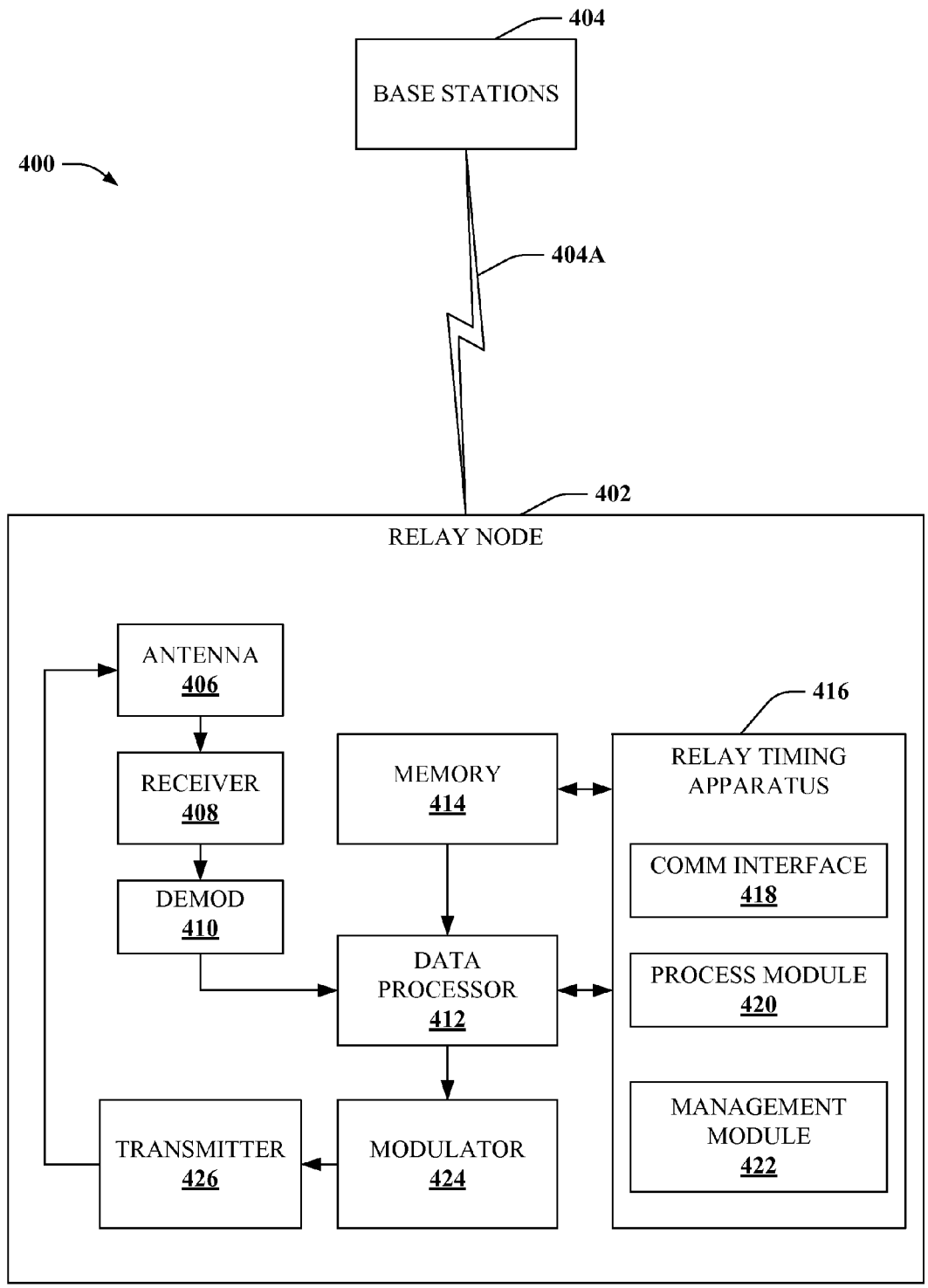
FIG. 4 illustrates a block diagram of an example timing configuration apparatus for a relay node according to aspects of the present disclosure.

FIG. 4 illustrates a block diagram of an example timing configuration apparatus for a relay node according to aspects of the present disclosure. In one aspect, FIG. 4 illustrates an example system comprising a RN 402 communicatively coupled with a base station (BS) 404 over a BH network 404A. Particularly, BH network 404A may be configured on a per RN basis with a set of subframes, such as MBSFN subframes at the RN, or the like. BS 404 transmits on DL subframes of the BH network 404A, whereas RN 402 responds on UL subframes of the BH network 404A. Further, timing configuration and periodicity of the DL transmission and UL responses are governed by a BH timing configuration, as described herein.

RN 402 includes at least one antenna 406 (e.g., comprising one or more input/output interfaces) that receives a signal and receiver(s) 408, which perform typical actions (e.g., filters, amplifies, down-converts, etc.) on the received signal. In general, antenna 406 and a transmitter 426 (collectively referred to as a transceiver) may be configured to facilitate wireless data exchange with base station(s) 404. The receiver 408, demodulator 410, modulator 424 and transmitter 426 may be configured for half-duplex transmission and reception. Further, it is to be appreciated that the BH timing configuration may accommodate the half-duplex transmission and reception for the BH network, as well as an AL network between RN 402 and an access terminal (not depicted).

Antenna 406 and receiver(s) 408 may also be coupled with a demodulator 410 that may demodulate received symbols and provide such signals to a data processor(s) 412 for evaluation. The data processor(s) 412 may control and/or reference one or more components (406, 408, 410, 414, 416, 428, 430) of AT 402. Further, data processor(s) 412 may execute one or more modules, applications, engines, or the like that comprise information or controls pertinent to executing functions of RN 402.

Additionally, memory 414 of RN 402 is operatively coupled to data processor(s) 412. Memory 414 may store data to be transmitted, received, and the like, and instructions suitable to conduct wireless communication with a remote device (404). Specifically, the instructions may be utilized to implement the various functions described above, or elsewhere herein. Further, although not depicted, memory 414 may store the modules, applications, engines, etc. (e.g., analysis module 420, selection module 422, dynamic switching module 424, timing module 426) associated with CE selection apparatus 416 and executed by processor(s) 412, above.

RN 402 further comprises a relay timing apparatus 416 for managing UL response transmission timing for RN 402 consistent with a BH timing configuration established by BS 404. Particularly, relay timing apparatus 416 may comprise a half-duplex communication interface 418 for sending and receiving data on the BH network or for sending and receiving data on the wireless AL (e.g., by employing transmitter 426, receiver 408 and antenna 406). Further, apparatus 416 may comprise memory (e.g., memory 414) for storing modules configured to implement a consistent timing configuration for the BH network or the AL network, and a data processor (e.g., data processor 412) for executing the modules. Specifically, the modules may comprise a process module 420 for obtaining control messages on a DL over the BH network, and a management module 422 for transmitting or receiving data according to the consistent timing configuration on either the BH network or the AL, wherein the consistent timing configuration comprises an ad-hoc timing rule for control response on the BH network, as described herein.

The aforementioned systems and/or apparatuses have been described with respect to interaction between several components, modules and/or communication interfaces. It should be appreciated that such systems and components/modules/interfaces may include those components/modules or sub-modules specified therein, some of the specified components/modules or sub-modules, and/or additional modules. Sub-modules could also be implemented as modules communicatively coupled to other modules rather than included within parent modules. Additionally, it should be noted that one or more modules could be combined into a single module providing aggregate functionality. For instance, control module 308 may include verification module 310, or vice versa, to facilitate sending control information and receiving a response to the control information and verifying the response by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, may automate certain mechanisms or processes performed thereby to make portions of the systems and methods more adaptive as well as efficient and intelligent.

Figure 5:
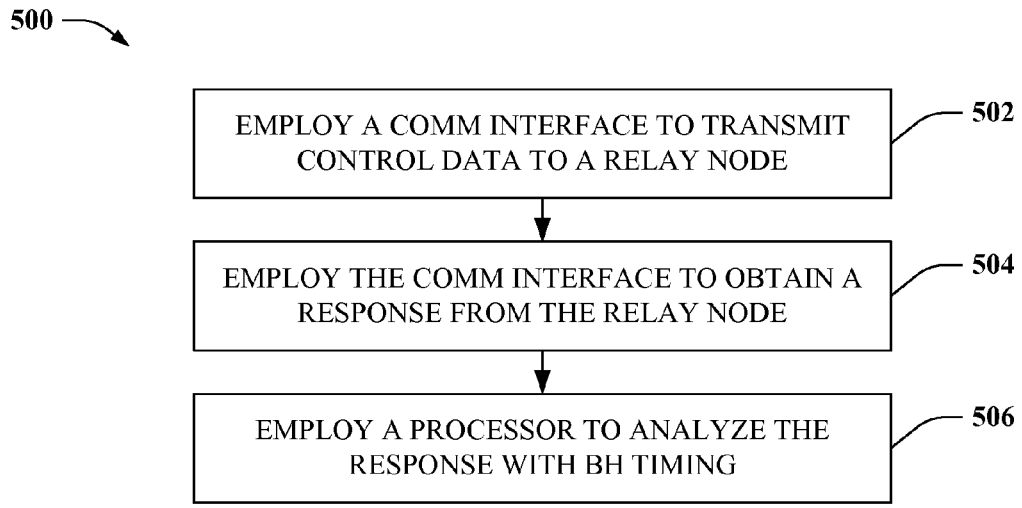
FIG. 5 illustrates a first example of a flow diagram for transmit-response timing for relay operation in a wireless communication system.
Figure 6:
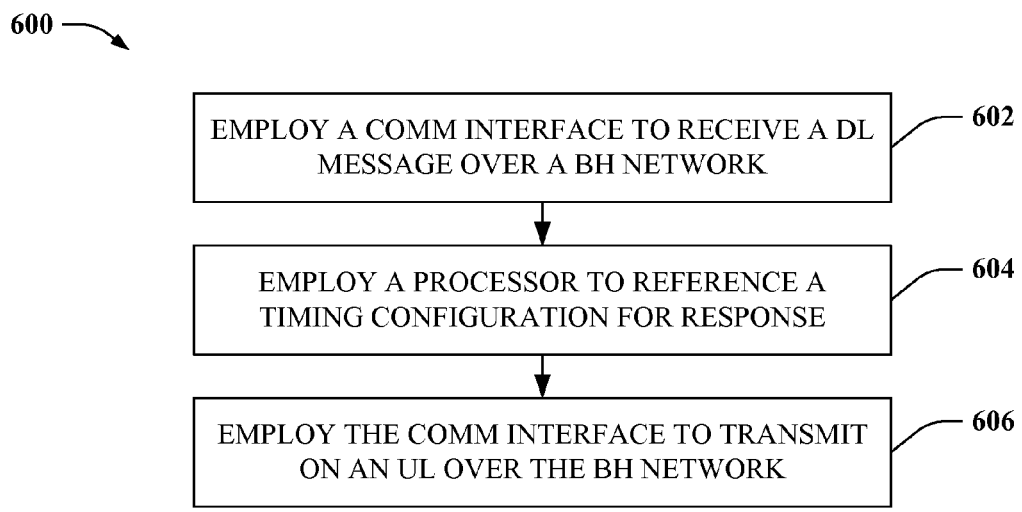
FIG. 6 illustrates a second example of a flow diagram for transmit-response timing for relay operation in a wireless communication system.

In view of the exemplary systems described supra, methodologies that may be implemented in accordance with the disclosed subject matter will be better appreciated with reference to the flow charts of FIGS. 5 and 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 5 illustrates a first example of a flow diagram for transmit-response timing for relay operation in a wireless communication system. In one aspect, FIG. 5 illustrates an example methodology 500 for providing timing configuration in a wireless network. At 502, method 500 may comprise employing a communication interface to transmit control data to a relay node (RN) over a wireless backhaul (BH) according to a BH timing configuration. Further, at 504, method 500 may comprise employing the communication interface to receive a response to the control data from the relay node over the wireless BH according to the BH timing configuration. In addition to the foregoing, method 500 may comprise employing a data processor to analyze the response for consistency with the BH timing configuration, wherein the BH timing configuration provides BH response periodicity that accommodates a plurality of legacy H-ARQ timing configurations.

FIG. 6 illustrates a second example of a flow diagram for transmit-response timing for relay operation in a wireless communication system. In one aspect, FIG. 6 illustrates a sample methodology 600 for providing a relay node in wireless communications. At 602, method 600 may comprise employing a communication interface to receive a downlink (DL) message over a backhaul (BH) network comprising control data. In addition method 600 may comprise, at 604, employing a data processor to reference a control specification to determine a timing configuration for responding to the control data over the BH network. In at least one aspect, the determination of the timing configuration corresponds to the determination of the set of subframes for UL backhaul communication. Further to the above, at 606, method 600 may comprise employing the communication interface to transmit a response message on an UL over the BH network, wherein the timing configuration supports both 10 ms and 8 ms wireless timing configurations.

Figure 7:
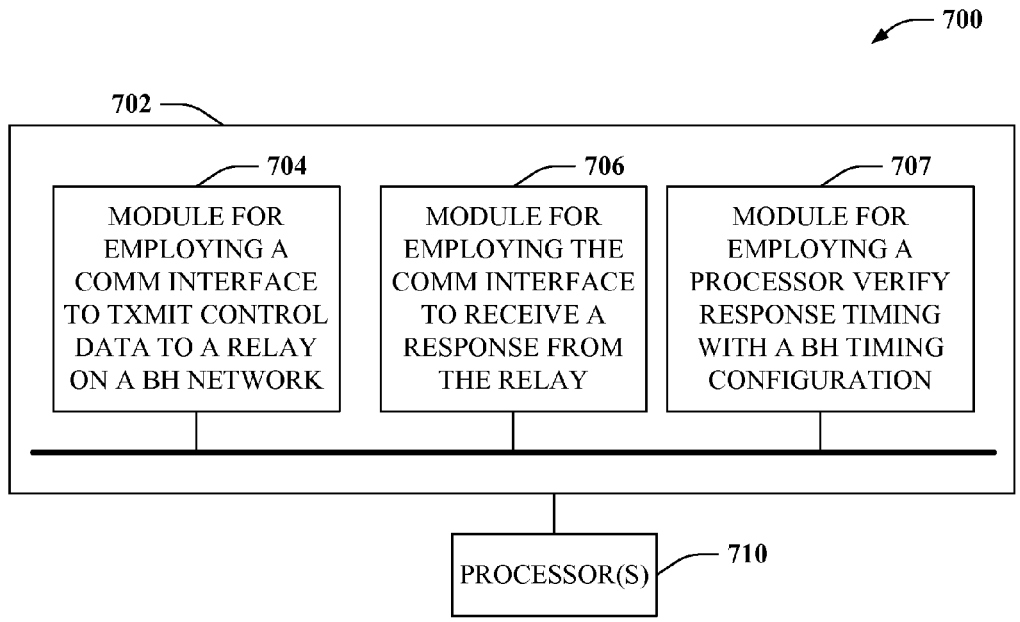
FIG. 7 illustrates a first example of an electronic device capable of being configured for transmit-response timing for relay operation in a wireless communication system.
Figure 8:
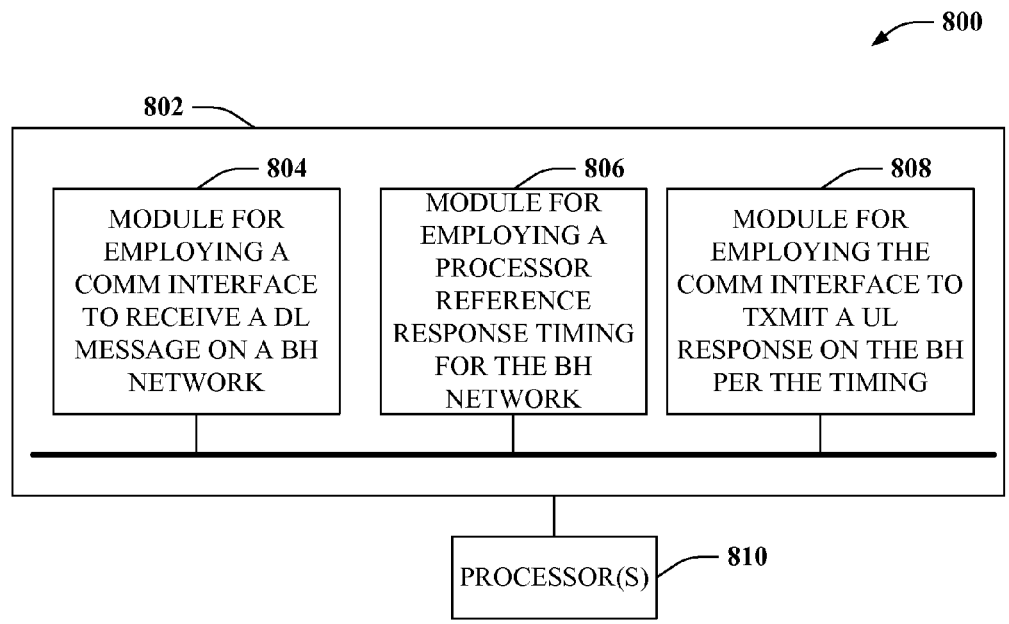
FIG. 8 illustrates a second example of an electronic device capable of being configured for transmit-response timing for relay operation in a wireless communication system.

FIGS. 7 and 8 respectively illustrate a first and a second example of an electronic device capable of being configured for transmit-response timing for relay operation in a wireless communication system. In one aspect, FIGS. 7 and 8 depict block diagrams of respective example apparatuses 700, 800 for facilitating network-triggered route optimized mobile communication according to various aspects of the present disclosure. For example, apparatuses 700, 800 may reside at least partially within a wireless communication network and/or within a transmitter such as a node, base station, access point, user terminal, personal computer coupled with a mobile interface card, or the like. It is to be appreciated that apparatuses 700, 800 are represented as including functional blocks, which may be functional blocks that represent functions implemented by a processor, software, or combination thereof (e.g., firmware).

Apparatus 700 may comprise memory 702 for storing one or more program modules configured for consistent timing configuration in a wireless network employing relay node communication. Further, apparatus 700 may comprise one or more data processors 710 for executing the program modules. Specifically, apparatus 700 may comprise a module 702 for employing a communication interface to transmit control data to a RN over a wireless BH according to a BH timing configuration. Further, apparatus 700 may comprise a module 704 for employing the communication interface to receive a response to the control data from the relay node over the wireless BH according to the BH timing configuration. In addition to the foregoing, apparatus 700 may comprise a module 706 for employing a data processor to analyze the response for consistency with the BH timing configuration, wherein the BH timing configuration provides BH response periodicity that accommodates a plurality of legacy H-ARQ timing configurations.

Apparatus 800 may comprise memory 802 for storing one or more program modules configured for managing a half-duplex relay node in wireless communication according to further aspects of the present disclosure. In addition, apparatus 800 may comprise a data processor(s) 810 for executing the program modules. Particularly, apparatus 800 may comprise a module 804 for employing a communication interface to receive a DL message over a BH network comprising control data. Furthermore, apparatus 800 may comprise a module 806 for employing a data processor to reference a control specification to determine a timing configuration for responding to the control data over the BH network. Moreover, apparatus 800 may comprise a module 808 for employing the communication interface to transmit a response message on an UL over the BH network, wherein the timing configuration supports both 10 ms and 8 ms wireless timing configurations.

In one aspect, an in-band relay link is half-duplex, such that transmit and receive operation do not occur simultaneously. In one example, MBSFN subframes may have a periodicity based on 10 ms or 40 ms. And, subframes {0,4,5,9} for FDD mode or subframes {0,1,5,6} for TDD mode may not be configured for MBSFN. In another example, H-ARQ operation is incompatible with MBSFN periodicity. For example, on the downlink H-ARQ is asynchronous and on the uplink H-ARQ is synchronous, with a round trip time (RTT) of 8 ms for FDD mode and 10 ms or greater for TDD mode. In another example, fixed ACK/NACK timing is 4 ms for FDD mode and 4 ms or greater for TDD mode.

In one aspect, for downlink H-ARQ, re-transmission timing may be solved by asynchronous operation. H-ARQ process identifier may be embedded in a DCI and existing UE procedures may be sufficient. In another aspect, access node timing is included. For example a minimum H-ARQ RTT of 8 ms may be supported. In another example, potentially asymmetric operation with multiple downlink transmissions for one uplink ACK/NACK may occur.

In another aspect, for uplink H-ARQ, re-transmission timing and access node timing is incorporated. For example, a minimum H-ARQ RTT of 8 ms may be supported. Potentially asymmetric operation with multiple uplink transmissions for one PHICH instance may occur.

In one aspect, timing reconfiguration may occur on a relay backhaul only, on an access link only, or on a combination of both links. In one example, the timing reconfiguration may be localized on the relay backhaul. For example, the impact on E-UTRA Rel-8 UEs over the access link may be minimal as well as for E-UTRA Rel-10 or later UEs.

In another aspect, downlink backhaul subframes are semi-statically configured and uplink backhaul subframes may be semi-statically configured or implicitly derived from the downlink configuration. In one example, the configuration may be explicit which is flexible, symmetric, and has better load adaptation. In another example, the configuration may be implicit which is mainly applicable to symmetric downlink/uplink loading. In one aspect, explicit downlink and uplink backhaul subframes configurations are used.

In another aspect, since at least one uplink subframe is configured for the backhaul link, some or all uplink H-ARQ process identifiers will be impacted in terms of longer H-ARQ RTTs. In one example, some uplink subframes (e.g. backhaul subframes) may not be available for a relay UE (RUE) to transmit PUSCH. In one aspect, the impact over all H-ARQ process IDs are equalized to allow easier scheduler implementation, that is, the eNodeB does not distinguish different uplink traffic types to pick H-ARQ IDs. In one example, downlink relay full-buffer results show that performance optimization is backhaul limited. That is, a significant portion of resources is used to be allocated to the backhaul even with four relays per cell. Similar results are expected for the uplink as well.

In one example, when the design impact is within 25%, equalization is used, otherwise localization may be used. The impact of 8 ms or 10 ms based RTT is based on scheduler complexity, but is not expected to be different. In another example, when flexible/asymmetric downlink/uplink subframes are configured, it may become difficult to define an optimal H-ARQ RTT, where optimality is determined by impact of uplink operation, uplink access node overload balancing, PHICH load balancing, etc. In one example, only one H-ARQ RTT, with localized impact, is used.

In another aspect, the same H-ARQ RTT design philosophy may be applicable to both FDD and TDD modes. In another aspect, the design impacts on channel quality indicator (CQI), rank indicator (RI), and precoding matrix indicator (PMI) are evaluated. For example, CQI/PMI periodicity may be 2/5/10/20/40/80/160/32/64/128 ms for FDD mode or 1/5/10/20/40/80/160 ms for TDD mode. For example, RI periodicity may be a factor of 1, 2, 4, 8, 16, or 32 times that of CQI/PMI, with an offset ranging from 0 to $(-N_p-1)$ or $(-N_p)$. For example, scheduling request (SR) periodicity may be 5/10/20/40/80 ms. For example, sounding reference signal (SRS) periodicity may be 2/5/10/20/40/80/160/320 ms.

In another aspect, the design impact on PUSCH hopping is considered. For example, a 10 ms based hopping design for FDD mode and a 40 ms based hopping design for TDD mode are applicable. In one example, a 10 ms H-ARQ RTT implies that there is no PUSCH hopping for FDD mode. In addition, there is no new R-PDCCH and the uplink H-ARQ in the backhaul is still synchronized.

In one example, explicit uplink backhaul subframe configuration may be used. For example, an asymmetric downlink/uplink configuration is supported. There may be consistent backhaul and access link subframe configuration periodicity for each link. That is, the backhaul and access link subframes naturally complement each other. For example, the downlink configuration may be either 10 ms or 40 ms. For example, the uplink configuration may be downlink dependent. In one example, if the downlink is based on 40 ms, the uplink may be based on 8 ms. In another example, if the downlink is based on 10 ms, the uplink may be based on 10 ms, a multi-mode configuration, which may not be used. In another aspect, one may ensure a 8 ms H-ARQ RTT for both backhaul and access links as much as possible. For example, if frame n is configured as a backhaul (or access link), n+8k is configured with backhaul (or access link). In one example, this localizes the impact to H-ARQ process IDs. In another aspect, a 40 ms based configuration may also be used.

In another aspect, a backhaul H-ARQ timeline may be based on E-UTRA Rel-8 timeline for both downlink and uplink, with several options. In a first option, a backhaul RTT timing may be explicitly indicated via layer 3 (semi-static)

configuration on a per Donor eNodeB basis (since it would be an overkill if on a per RN basis). In a second option, a backhaul RTT timing may be explicitly indicated via layer 2 (in R-PDCCH), for example, in 3 bits to indicate timing. In a third option, a backhaul RTT timing may be specified in the specifications as a specific and unambiguous rule which defines a timing relationship between, for example, R-PD-SCH and uplink access node, R-PDCCH and R-PUSCH, R-PUSCH and R-PDCCH/PHICH. In one aspect, the rule may be expressed as follows: for the downlink, between R-PDSCH and uplink access node, use a first available uplink subframe at or after 4 ms; for the uplink, between R-PDCCH and R-PUSCH, use a first available uplink subframe at or after 4 ms, between R-PUSCH and R-PDCCH/PHICH, use a first available downlink subframe at or after 4 ms. In another example, other rules are possible, for example 4+ck, e.g. c=8.

In another aspect, an access link H-ARQ timeline may be based on E-UTRA Rel-8, where the implementation handles mismatched configurations. The downlink/uplink backhaul configuration may be such that there is at least one downlink access link subframe (n) associated with one uplink access link subframe (n+4), that there is at least one uplink H-ARQ process ID not impacted, which implies that at least one uplink access link subframe m exists such that all (m+8k) subframes are uplink access link subframes. In another aspect, the downlink/uplink backhaul configuration may satisfy downlink/uplink pairing as much as possible while taking the loading into account such that E-UTRA Rel-8 UEs may benefit as much as possible and such that minimal changes are expected for E-UTRA Rel-10 or later UEs. In another aspect, for unpaired downlink/uplink access link subframes, E-UTRA Rel-10 or later UEs may utilize TDD-like rules for downlink scheduling and uplink access node feedback. Alternatively, if there are not E-UTRA Rel-10 or later changes at all, either users accommodate some loss due to unpairing or asymmetric configuration may not be allowed.

In another aspect, asymmetric configurations in the backhaul and access links may be accommodated. For example, there may be a N to 1 mapping between the downlink to the uplink, where N is up to 6. In one example, multiple downlink PDSCH may require multiple access node feedback in one uplink subframe. In another example, TDD-like uplink access node bundling may be used to address this issue. For example, for up to 4:1 ratio, both bundling and multiplexing may be supported; otherwise, only bundling is supported. In another example, layer 3 or layer 2 H-ARQ configuration may be used to balance access node loading over different uplink backhaul subframes which may not justify the additional complexity. In another example, there may be a 1 to M mapping between the downlink to the uplink. In one example, multiple uplink PUSCH may require PHICH/PDCCH simultaneously in one downlink subframe. In another example, TDD-like uplink access node bundling may also be used to address this issue. For example, one PDCCH may schedule two or more PUSCH transmissions with the same resource allocation, MCS, etc. Moreover, up to two PUSCHs may be used, e.g. limited to the first two uplink subframes. In another example, PHICH may be used to suspend some uplink transmissions.

In another aspect, asynchronous/synchronous uplink H-ARQ on the backhaul may be accommodated. In one example, for asynchronous operation, define only the timing between R-PDCCH and R-PUSCH. In another example, for synchronous operation, define only explicit combinations of R-PDCCH with R-PUSCH and R-PUSCH with R-PDCCH/ R-PHICH delays. In one example, asynchronous H-ARQ operation for flexible uplink transmission in the backhaul link may be used, in which case there is no need to define R-PUSCH with R-PDCCH time relationship.

In another aspect, R-PHICH may be replaced by R-PDCCH at the expense of overhead efficiency. In one example, such efficiency loss is not deemed to be significant and it may be used to not support R-PHICH. In case of synchronous H-ARQ operation in the uplink backhaul, when the relay node misses the R-PDCCH, the relay node may treat it as an ACK to suspend the R-PUSCH transmission.

In another aspect, the impact on CQI may be assessed. In one example, depending on the CQI/RI and access link uplink configuration, the effective CQI/RI periodicity may be very large. For example, for 8 ms based periodicity, compatible CQI periodicities, assuming a non-zero RI subframe offset, are 40/80/160/32/64/128 ms for 2-3 uplink H-ARQ processes, where 32 ms CQI may be achieved without unintended CQI transmission; 20 ms for 4-7 processes, where 20 ms CQI may be achieved without unintended CQI transmission; and 2/5/10 ms is incompatible, with significant portions of unintended CQI/RI transmissions are possible. For example, for 10 ms based periodicity, compatible CQI periodicities are 10/20/40/80/160 ms for 2-3 uplink H-ARQ processes, where 32 ms CQI may be achieved without unintended CQI transmission; 5 ms for 4 processes, where 20 ms CQI may be achieved without unintended CQI transmission; and 2 ms for 5-7 processes, assuming zero RI offset.

In another aspect, solutions are disclosed to alleviate CQI latency and unintended transmission. For example, a first solution is to configure uplink access link with a multiple of both 8 ms and 10 ms, for example, 40 ms based. In one example, periodicities of {0,8,10,16,20,24,30,32} map into three additional for 1 uplink H-ARQ process. In one aspect, the performance hit is 20% for 3 H-ARQ processes in the backhaul, but there are 7 H-ARQ processes in the backhaul. In another example, periodicities of {0,4,8,10,12,16,20,24, 28,30,32,36} map into two additional for 2 uplink H-ARQ processes. In one aspect, the performance hit is 20% for 2 H-ARQ processes in the backhaul, but there are 6 H-ARQ processes in the backhaul. In another aspect, a solution may be performed under eNodeB/RN control and may be realized via a 40 ms based bitmap. In another aspect, aligning with CQI/RI configurations, e.g. periodicity, offset, etc. is an option.

For example another solution is aimed for E-UTRA Rel-10 or later UEs or backhaul. In one example, in the case of a <8 ms or 10 ms periodicity, some TDD design concepts may be applied. For example, 1 ms periodicity means all available uplink subframes may be used for the backhaul and/or access links. For example, 8 ms and 16 ms periodicities may be introduced as CQI periodicity. For example, E-UTRA Rel-10 or later UE knowledge of uplink subframe configuration may also help prevent unintended transmissions.

In another aspect, the impact to SRS depends on timing design. For example, if the RN uplink transmits to receive switch occurs before the last symbol, there is no SRS impact. Otherwise, there is a similar impact/design as for CQI. In another aspect, the impact to SR is similar to the impact/ design as for CQI.

In another aspect, TDD mode may employ either 5 ms or 10 ms switching. In one example, a configuration may support relay operation with 3 possible relay timelines and may use a 10 ms based uplink configuration. In one example, the backhaul is backward compatible as well. For example, a configuration using less than 10 ms CQI/SR/SRS periodicity may cause unintended transmission. For example, knowledge of backhaul subframe configuration is helpful for E-UTRA Rel-10 or later UEs to prevent such unintended transmission.

Since two special subframes are both allocated to the access link, there is no specified subframe in the backhaul.

In another aspect, for other TDD mode configurations, not all subframes are backward compatible. In one example, extending the periodicity from 10 ms to 40 ms to accommodate more configurations for type-1 relay support is disclosed.

In one aspect, a revised timing design which supports explicit uplink backhaul subframe configurations may be employed in a wireless system with a relay node. For example, asymmetric downlink and uplink configurations may be supported. To handle asymmetry, for example multiple downlinks with one uplink or one downlink with multiple uplinks, use TDD-like uplink access node bundling, PDCCH DCI format 0-like scheduling for TDD configuration #0 (e.g. one downlink scheduling up to 2 or more uplinks), where (R)PHICH overloading may also be designed similar to PUCCH, but R-PHICH may not be supported. For example, in FDD mode, a 40 ms configuration of both downlink and uplink backhauls may be supported, using a 40 bit map on a per relay basis. Alternatively, regarding the overhead and flexibility, a 8 ms (i.e., 8 bit) based configuration may be used. For example, in TDD mode, a 10 ms configuration of both downlink and uplink backhauls may be supported. Alternatively, a 40 ms configuration may also be used to enable supporting relay for some TDD configurations.

In another aspect, a deterministic H-ARQ timing relationship may be used. For example, once the set of downlink and uplink backhaul subframes are configured, the H-ARQ timing is deterministic. In another aspect, asynchronous uplink H-ARQ operation over the backhaul is supported. In another aspect, R-PHICH is not supported, where a missing R-PDCCH is treated as an ACK in case of no R-PHICH.

In another aspect, the eNodeB may balance downlink/uplink overloads via a 3 bit signaling. For example, on the downlink, avoid multiple PHICH/PDCCH mapping occurrences and on the uplink, avoid multiple access node mapping occurrences. In another aspect, the same design philosophy applies to TDD mode. For example, an indicator may be used to adjust delay and loading. If access node overloading (i.e., multiple downlinks to one uplink) is deemed undesirable in a relay backhaul, this situation may be resolved via the explicit 3 bit signaling.

Figure 9:
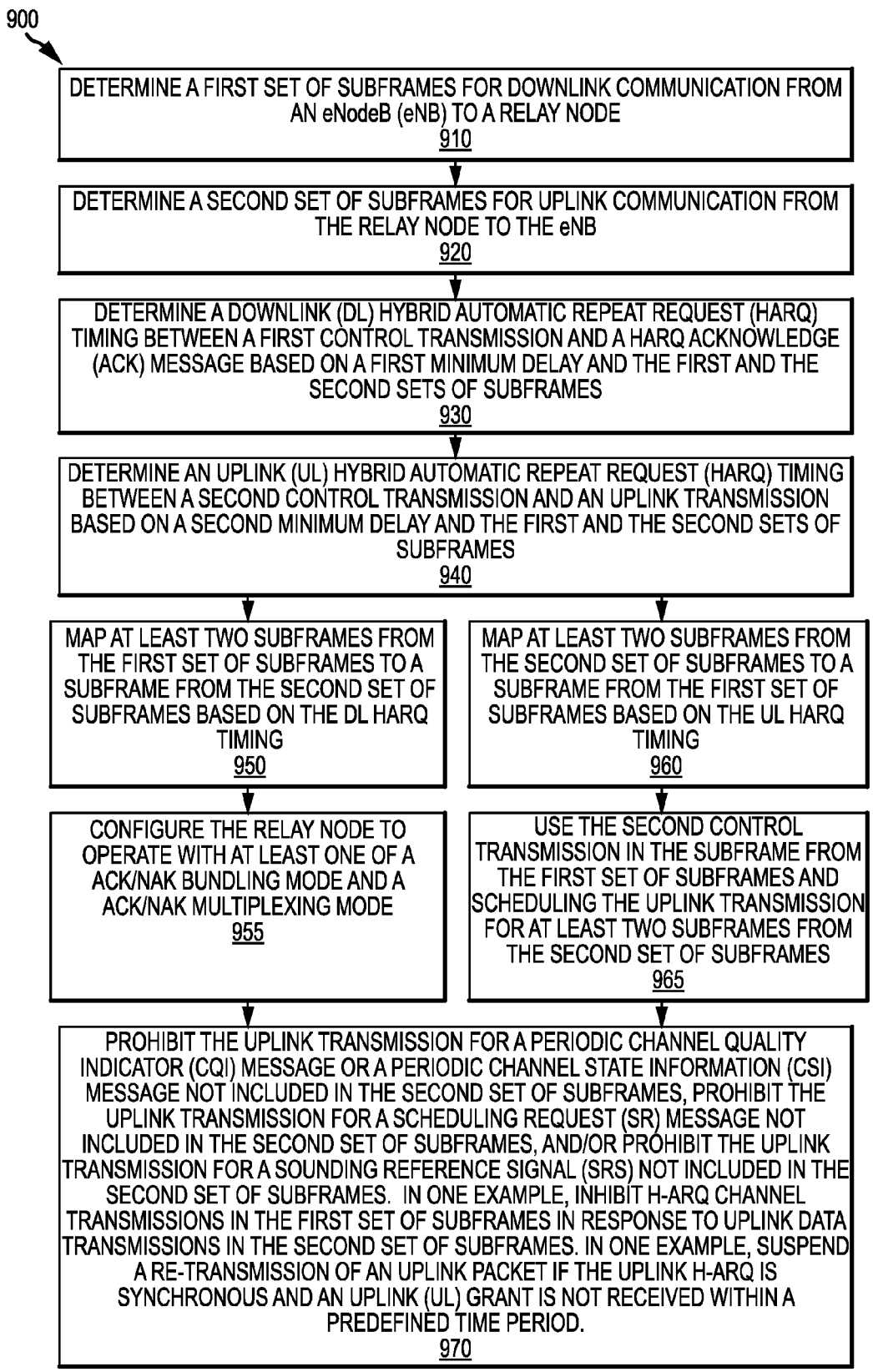
FIG. 9 illustrates an example flow diagram for relay operation in a wireless communication system.

FIG. 9 illustrates an example flow diagram for relay operation in a wireless communication system. In block 910, determine a first set of subframes for downlink communication from an eNodeB (eNB) to a relay node. In block 920, determine a second set of subframes for uplink communication from the relay node to the eNB. In one example, the first set of subframes and the second set subframes contain different quantities of subframes. In block 930, determine a downlink (DL) hybrid automatic repeat request (HARQ) timing between a first control transmission and a HARQ acknowledge (ACK) message based on a first minimum delay and the first and the second sets of subframes. In block 940, determine an uplink (UL) hybrid automatic repeat request (HARQ) timing between a second control transmission and an uplink transmission based on a second minimum delay and the first and the second sets of subframes. In one example the first minimum delay is 4 ms. In one example, the second minimum delay is 4 ms. In one example, the second set of subframes is based on the first set of subframes, and at least one of the first or second minimum delays.

Following block 940, in block 950, map at least two subframes from the first set of subframes to a subframe from the second set of subframes based on the DL HARQ timing; and in block 955, configure the relay node to operate with at least one of a ACK/NAK bundling mode and a ACK/NAK multiplexing mode. In one example, one or more of the steps in blocks 950 and 955 is optional.

In another aspect, following block 940 in block 960, map at least two subframes from the second set of subframes to a subframe from the first set of subframes based on the UL HARQ timing. In one example, the UL HARQ timing is asynchronous. In one example, the UL HARQ timing has a configuration periodicity of 8 ms for frequency division duplex (FDD) or a configuration periodicity of 10 ms for time division duplex (TDD). In one example, the DL HARQ timing has a configuration periodicity of 40 ms for frequency division duplex (FDD) or a configuration periodicity of 10 ms for time division duplex (TDD). In one example, at least one of the UL HARQ timing or DL HARQ timing is the same as HARQ timing in the Evolved Universal Terrestrial Radio Access (E-UTRA) Release 8 standard.

Following block 960, in block 965, use the second control transmission in the subframe from the first set of subframes and scheduling the uplink transmission for at least two subframes from the second set of subframes. In one example, one or more of the steps in blocks 960 and 965 is optional.

Following either blocks 955 or 965, in block 970, prohibit the uplink transmission for a periodic channel quality indicator (CQI) message not included in the second set of subframes, prohibit the uplink transmission for a scheduling request (SR) message not included in the second set of subframes, and/or prohibit the uplink transmission for a sounding reference signal (SRS) not included in the second set of subframes. In one example, the periodic channel quality indicator (CQI) message is replaced by a periodic channel state information (CSI) message, and the uplink transmission of the periodic CSI message not included in the second set of subframes is prohibited. In one example, included in block 970, H-ARQ channel transmissions in the first set of subframes is inhibited in response to uplink data transmissions in the second set of subframes. Inhibiting the H-ARQ channel transmissions may be optionally implemented with or without one or more of the prohibiting steps in block 970. In one example, included in block 970, a re-transmission of an uplink packet is suspended if the uplink H-ARQ is synchronous and an uplink (UL) grant is not received within a predefined time period. Suspending the re-transmission of the uplink packet may be optionally implemented with or without one or more of the prohibiting steps in block 970. One skilled in the art would understand that the predefined time period is not restricted to a particular time period and may be chosen based on many factors, including for example, application, usage, design choice, etc., without limiting the scope or spirit of the present disclosure. In one aspect, one or more of the steps illustrated in FIG. 9 is performed by an eNodeB (eNB). In another aspect, one or more of the steps illustrated in FIG. 9 is performed by a relay node (RN).

Figure 10:
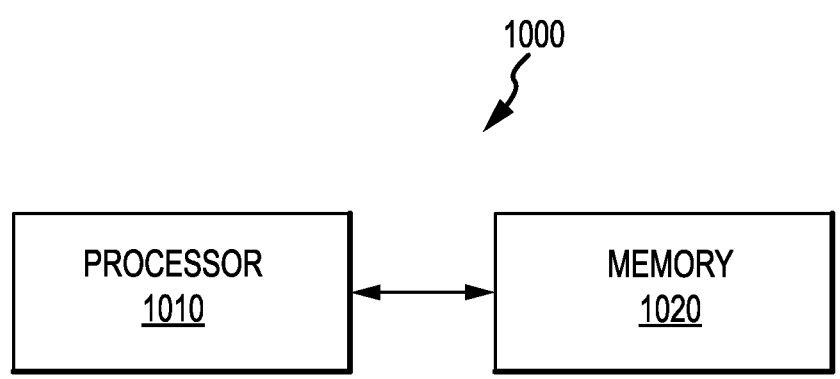
FIG. 10 illustrates an example of a device comprising a processor in communication with a memory for executing the processes for relay operation in a wireless communication system.

FIG. 10 illustrates an example of a device 1000 comprising a processor 1010 in communication with a memory 1020 for executing the processes for relay operation in a wireless communication system. In one example, the device 1000 is used to implement the algorithms illustrated in FIGS. 5, 6 and 9. In one aspect, the memory 1020 is located within the processor 1010. In another aspect, the memory 1020 is external to the processor 1010. In one aspect, the processor includes circuitry for implementing or performing the various flow diagrams, logical blocks and/or modules described herein.

Figure 11:
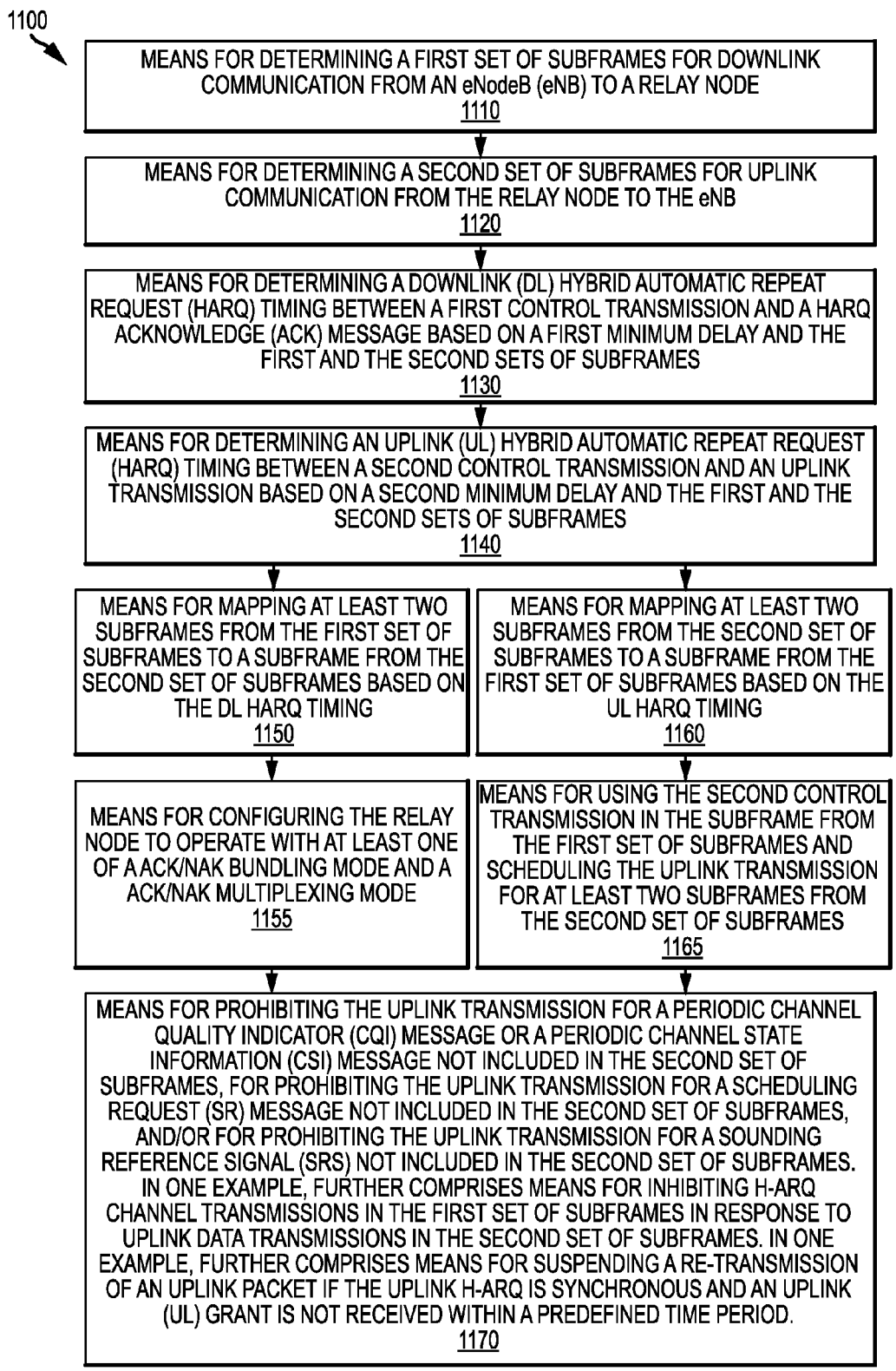
FIG. 11 illustrates an example of a device suitable for relay operation in a wireless communication system.

FIG. 11 illustrates an example of a device 1100 suitable for relay operation in a wireless communication system. In one aspect, the device 1100 is implemented by at least one processor comprising one or more modules configured to provide different aspects of relay operation as described herein in blocks 1110, 1120, 1130, 1140, 1150, 1155, 1160, 1165 and 1170. In one example, included in block 1170 is a means for inhibiting H-ARQ channel transmissions in the first set of subframes in response to uplink data transmissions in the second set of subframes. The means for inhibiting may be optionally enabled with one or more of the prohibiting functions to be executed by the prohibiting means in block 1170. In one example, included in block 1170 is a means for suspending a re-transmission of an uplink packet if the uplink H-ARQ is synchronous and an uplink (UL) grant is not received within a predefined time period. Suspending the re-transmission of the uplink packet may be optionally implemented with or without one or more of the prohibiting functions to be executed by the prohibiting means in block 1170. One skilled in the art would understand that the predefined time period is not restricted to a particular time period and may be chosen based on many factors, including for example, application, usage, design choice, etc., without limiting the scope or spirit of the present disclosure.

For example, each module comprises hardware, firmware, software, or any combination thereof. In one aspect, the device 1100 is also implemented by at least one memory in communication with the at least one processor. In one example, all the blocks illustrated in FIG. 11 may be combined to form a relay operation. In another example, some of the blocks illustrated in FIG. 11 may be selected to form a relay operation. For example, a relay operation may comprise of blocks 1120, 1130, 1140, and 1170 without the other blocks. In another example, the blocks illustrated in FIG. 11 are not exclusive.

One skilled in the art would understand that the steps disclosed in the example flow diagrams in FIGS. 5, 6 and 9 may be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above may also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for relay operation in a wireless communication system comprising:
   determining a first set of subframes for downlink communication from an eNodeB (eNB) to a relay node;
   determining a second set of subframes for uplink communication from the relay node to the eNB;
   determining a downlink (DL) hybrid automatic repeat request (HARQ) timing between a first control transmission and a HARQ acknowledge (ACK) message based on a first minimum delay and the first and the second sets of subframes; and
   determining an uplink (UL) hybrid automatic repeat request (HARQ) timing between a second control transmission and an uplink transmission based on a second minimum delay and the first and the second sets of subframes.

2. The method of claim 1 wherein the first minimum delay is 4 ms.

3. The method of claim 1 wherein the second minimum delay is 4 ms.

4. The method of claim 1 wherein the second set of subframes is based on the first set of subframes, and at least one of the first or second minimum delays.

5. The method of claim 1 wherein the first set of subframes and the second set subframes contain different quantities of subframes.

6. The method of claim 5 further comprising mapping at least two subframes from the first set of subframes to a subframe from the second set of subframes based on the DL HARQ timing.

7. The method of claim 6 further comprising configuring the relay node to operate with at least one of a ACK/NAK bundling mode and a ACK/NAK multiplexing mode.

8. The method of claim 5 further comprising mapping at least two subframes from the second set of subframes to a subframe from the first set of subframes based on the UL HARQ timing.

9. The method of claim 8 further comprising using the second control transmission in the subframe from the first set of subframes and scheduling the uplink transmission for at least two subframes from the second set of subframes.

10. The method of claim 5 wherein the UL HARQ timing is asynchronous.

11. The method of claim 1 wherein the UL HARQ timing has a configuration periodicity of 8 ms for frequency division duplex (FDD) or a configuration periodicity of 10 ms for time division duplex (TDD).

12. The method of claim 1 wherein the DL HARQ timing has a configuration periodicity of 40 ms for frequency division duplex (FDD) or a configuration periodicity of 10 ms for time division duplex (TDD).

13. The method of claim 1 wherein at least one of the UL HARQ timing or DL HARQ timing is the same as HARQ timing in the Evolved Universal Terrestrial Radio Access (E-UTRA) Release 8 standard.

14. The method of claim 1 further comprising prohibiting the uplink transmission for a periodic channel state information (CSI) message not included in the second set of subframes.

15. The method of claim 1 further comprising prohibiting the uplink transmission for a scheduling request (SR) message not included in the second set of subframes.

16. The method of claim 1 further comprising prohibiting the uplink transmission for a sounding reference signal (SRS) not included in the second set of subframes.

17. The method of claim 1 further comprising inhibiting H-ARQ channel transmissions in the first set of subframes in response to uplink data transmissions in the second set of subframes.

18. The method of claim 17 further comprising suspending a re-transmission of an uplink packet if the uplink H-ARQ is synchronous and an uplink (UL) grant is not received within a predefined time period.

19. An apparatus for relay operation in a wireless communication system comprising:
   means for determining a first set of subframes for downlink communication from an eNodeB (eNB) to a relay node;
   means for determining a second set of subframes for uplink communication from the relay node to the eNB;
   means for determining a downlink (DL) hybrid automatic repeat request (HARQ) timing between a first control transmission and a HARQ acknowledge (ACK) message based on a first minimum delay and the first and the second sets of subframes; and
   means for determining an uplink (UL) hybrid automatic repeat request (HARQ) timing between a second control transmission and an uplink transmission based on a second minimum delay and the first and the second sets of subframes.

20. The apparatus of claim 19 wherein the first minimum delay is 4 ms.

21. The apparatus of claim 19 wherein the second minimum delay is 4 ms.

22. The apparatus of claim 19 wherein the second set of subframes is based on the first set of subframes, and at least one of the first or second minimum delays.

23. The apparatus of claim 19 wherein the first set of subframes and the second set subframes contain different quantities of subframes.

24. The apparatus of claim 23 further comprising means for mapping at least two subframes from the first set of subframes to a subframe from the second set of subframes based on the DL HARQ timing.

25. The apparatus of claim 24 further comprising means for configuring the relay node to operate with at least one of a ACK/NAK bundling mode and a ACK/NAK multiplexing mode.

26. The apparatus of claim 23 further comprising means for mapping at least two subframes from the second set of subframes to a subframe from the first set of subframes based on the UL HARQ timing.

27. The apparatus of claim 26 further comprising means for using the second control transmission in the subframe from the first set of subframes and scheduling the uplink transmission for at least two subframes from the second set of subframes.

28. The apparatus of claim 21 wherein the UL HARQ timing is asynchronous.

29. The apparatus of claim 19 wherein the UL HARQ timing has a configuration periodicity of 8 ms for frequency division duplex (FDD) or a configuration periodicity of 10 ms for time division duplex (TDD).

30. The apparatus of claim 19 wherein the DL HARQ timing has a configuration periodicity of 40 ms for frequency division duplex (FDD) or a configuration periodicity of 10 ms for time division duplex (TDD).

31. The apparatus of claim 19 wherein at least one of the UL HARQ timing or DL HARQ timing is the same as HARQ timing in the Evolved Universal Terrestrial Radio Access (E-UTRA) Release 8 standard.

32. The apparatus of claim 19 further comprising means for prohibiting the uplink transmission for a periodic channel state information (CSI) message not included in the second set of subframes.

33. The apparatus of claim 19 further comprising means for prohibiting the uplink transmission for a scheduling request (SR) message not included in the second set of subframes.

34. The apparatus of claim 19 further comprising means for prohibiting the uplink transmission for a sounding reference signal (SRS) not included in the second set of subframes.

35. The apparatus of claim 19 further comprising means for inhibiting H-ARQ channel transmissions in the first set of subframes in response to uplink data transmissions in the second set of subframes.

36. The apparatus of claim 35 further comprising means for suspending a re-transmission of an uplink packet if the uplink H-ARQ is synchronous and an uplink (UL) grant is not received within a predefined time period.

37. An apparatus for relay operation in a wireless communication system comprising a processor and a memory, the memory containing program code executable by the processor for performing the following:
   determining a first set of subframes for downlink communication from an eNodeB (eNB) to a relay node;
   determining a second set of subframes for uplink communication from the relay node to the eNB;

determining a downlink (DL) hybrid automatic repeat request (HARQ) timing between a first control transmission and a HARQ acknowledge (ACK) message based on a first minimum delay and the first and the second sets of subframes; and determining an uplink (UL) hybrid automatic repeat request (HARQ) timing between a second control transmission and an uplink transmission based on a second minimum delay and the first and the second sets of subframes.

38. The apparatus of claim 37 wherein the second set of subframes is based on the first set of subframes, and at least one of the first or second minimum delays.

39. The apparatus of claim 37 wherein the memory further comprising program code for mapping at least two subframes from the first set of subframes to a subframe from the second set of subframes based on the DL HARQ timing.

40. The apparatus of claim 39 wherein the memory further comprising program code for configuring the relay node to operate with at least one of a ACK/NAK bundling mode and a ACK/NAK multiplexing mode.

41. The apparatus of claim 37 wherein the memory further comprising program code for mapping at least two subframes from the second set of subframes to a subframe from the first set of subframes based on the UL HARQ timing.

42. The apparatus of claim 41 wherein the memory further comprising program code for using the second control transmission in the subframe from the first set of subframes and scheduling the uplink transmission for at least two subframes from the second set of subframes.

43. The apparatus of claim 37 wherein the UL HARQ timing has a configuration periodicity of 8 ms for frequency division duplex (FDD) or a configuration periodicity of 10 ms for time division duplex (TDD).

44. The apparatus of claim 37 wherein the DL HARQ timing has a configuration periodicity of 40 ms for frequency division duplex (FDD) or a configuration periodicity of 10 ms for time division duplex (TDD).

45. The apparatus of claim 37 wherein the memory further comprising program code for prohibiting the uplink transmission for a periodic channel state information (CSI) message not included in the second set of subframes.

46. The apparatus of claim 37 wherein the memory further comprising program code for prohibiting the uplink transmission for a scheduling request (SR) message not included in the second set of subframes.

47. The apparatus of claim 37 wherein the memory further comprising program code for prohibiting the uplink transmission for a sounding reference signal (SRS) not included in the second set of subframes.

48. The apparatus of claim 37 wherein the memory further comprising program code for inhibiting H-ARQ channel transmissions in the first set of subframes in response to uplink data transmissions in the second set of subframes.

49. The apparatus of claim 48 wherein the memory further comprising program code for suspending a re-transmission of an uplink packet if the uplink H-ARQ is synchronous and an uplink (UL) grant is not received within a predefined time period.

50. A computer program product for relay operation in a wireless communication system comprising
a non-transitory computer-readable medium comprising:
codes for determining a first set of subframes for downlink communication from an eNodeB (eNB) to a relay node;
codes for determining a second set of subframes for uplink communication from the relay node to the eNB;
codes for determining a downlink (DL) hybrid automatic repeat request (HARQ) timing between a first control transmission and a HARQ acknowledge (ACK) message based on a first minimum delay and the first and the second sets of subframes; and
codes for determining an uplink (UL) hybrid automatic repeat request (HARQ) timing between a second control transmission and an uplink transmission based on a second minimum delay and the first and the second sets of subframes.

* * * * *